United States Patent [19]

Gray et al.

[11] 4,307,507

[45] Dec. 29, 1981

[54] METHOD OF MANUFACTURING A FIELD-EMISSION CATHODE STRUCTURE

[75] Inventors: Henry F. Gray, Alexandria, Va.; Richard F. Greene, Bethesda, Md.

[73] Assignee: The United States of America as represented by the Secretary of the Navy, Washington, D.C.

[21] Appl. No.: 185,702

[22] Filed: Sep. 10, 1980

[51] Int. Cl.[3] .......................... B01J 17/00; H01J 1/02

[52] U.S. Cl. .......................... 29/580; 29/25.14; 29/25.18; 29/569 R; 156/647; 313/309; 313/336; 313/351

[58] Field of Search ............... 29/25.14, 25.18, 569 R, 29/569 L, 580, 576 T; 313/309, 336, 351; 156/647

[56] References Cited

U.S. PATENT DOCUMENTS

| | | | |
|---|---|---|---|
| 3,623,219 | 11/1971 | Stollen et al. | 29/580 |
| 3,665,241 | 5/1972 | Spindt et al. | 313/351 |
| 3,755,704 | 8/1973 | Spindt et al. | 313/309 |
| 3,894,332 | 7/1975 | Nathanson et al. | 29/580 X |
| 3,921,022 | 11/1975 | Levine | 313/309 |
| 3,970,887 | 7/1976 | Smith et al. | 313/309 |
| 3,998,678 | 12/1976 | Fukase et al. | 156/3 |
| 4,008,412 | 2/1977 | Yuito et al. | 313/309 |
| 4,095,133 | 6/1978 | Hoeberechts | 313/336 |
| 4,193,836 | 3/1980 | Youmans et al. | 156/657 |
| 4,205,418 | 6/1980 | Przybylek | 29/25.18 |

*Primary Examiner*—G. Ozaki

*Attorney, Agent, or Firm*—Robert F. Beers; William T. Ellis; Alan P. Klein

[57] ABSTRACT

A method of manufacturing a field-emitter array cathode structure in which a substrate of single crystal material is selectively masked such that the unmasked areas define islands on the underlying substrate. The single crystal material under the unmasked areas is orientation-dependent etched to form an array of holes whose sides intersect at a crystallographically sharp point. Following removal of the mask, the substrate is covered with a thick layer of material capable of emitting electrons which extends above the substrate surface and fills the holes. Thereafter, the material of the substrate underneath the layer of electron-emitting material is etched to expose a plurality of sharp field-emitter tips.

6 Claims, 14 Drawing Figures

METHOD OF MANUFACTURING A FIELD-EMISSION CATHODE STRUCTURE

BACKGROUND OF THE INVENTION

This invention relates to new methods of manufacturing field-emitter array structures using semiconductor microminiature integrated circuit manufacturing techiques.

One prior art microstructure field emission cathode source is described in U.S. Pat. No. 3,665,241 issued May 23, 1972, to C. A. Spindt et al. This patent describes a method for fabricating a microstructure field emission electron source in which metal is evaporated into a mold having small holes formed by electron beam lithography. However, the shape of the field-emitter is determined by rotating the mold and by using more than one evaporation source.

SUMMARY OF THE INVENTION

Accordingly, it is an object of the present invention to form field-emitter array structures having uniformly sharp emitter tips.

Another object is to form field emitter array structures without having to rotate a mold.

A further object is to form field emitter array structures without using multiple evaporation sources.

Yet another object is to form field emitter array structures utilizing standard microminiature integrated circuit manufacturing techniques.

The objects of the present invention are achieved by a method of manufacturing a field emitter structure in which a mold shaped in the desired configuration is formed by the orientation dependent etching of a single crystal substrate through a perforated mask. In the simultaneous etching of a number of pointed holes in the substrate, a great uniformity of sharp points is obtained regardless of the etching time because further etching only makes a given hole deeper without changing the sharpness of the crystallographic plane intersection. The field emission cathode structure is formed in the mold by coating the substrate with a layer of a material capable of emitting electrons under the influence of an electric field. The substrate forming the mold is then partially or completely removed.

The process is not limited to a particular electron-emitting material; and any suitable metal, semiconductor, carbon, or conductive non-metal can be utilized. Some of these materials can be doped to provide sufficient conductivity, or control of emission, as well as to provide low work-function surfaces for enhanced electron emission.

The resulting field emitter structures can be made in flexible sheets and thus be formed into appropriately shaped cathodes for any desired electron gun design. For example, they can be bent into a "spherical" shape for a Pierce type cathode or wrapped into a cylinder for an electron gun or electronic device requiring cylindrical geometry, such as a gyrotron (electron cyclotron maser) gun.

Additional advantages and features will become apparent as the subject invention becomes better understood by reference to the following detailed description when considered in conjunction with the accompanying drawings wherein:

DESCRIPTION OF THE PREFERRED EMBODIMENT

The invention can best be described with reference to FIGS. 1–12 which depict the initial, intermediate and final structures produced by a series of manufacturing processing steps according to the invention.

Figure 1:
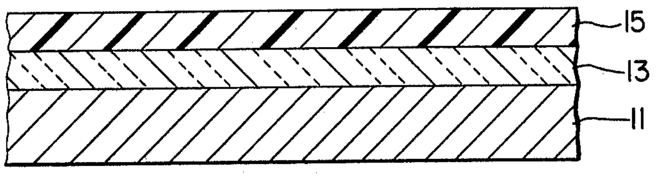
FIGS. 1–7 depict several of the basic preliminary steps in manufacturing a field emitter array structure in accordance with the invention.
Figure 2:
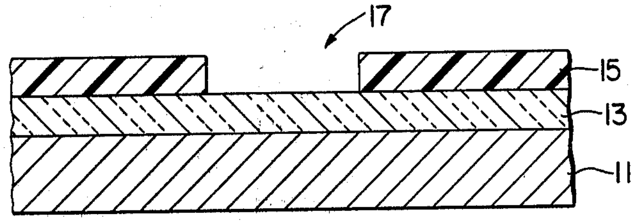
Figure 3:
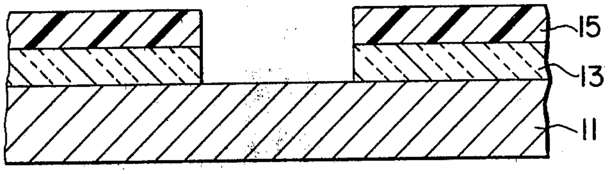
Figure 4:
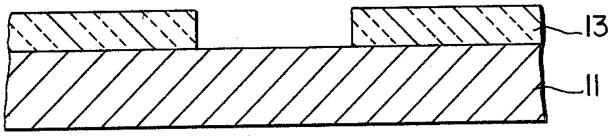

The starting point of the process is a wafer 11 of single crystal material having such a crystal orientation that the main planar surface of the wafer lies in the preferred direction of the orientation dependent etch to be used subsequently. The wafer can be, for example, (100) oriented silicon. It may be of any convenient diameter and thick enough to handle easily. The main surface of the wafer 11 is selectively masked such that the unmasked areas define one or more islands or dots on the surface of the underlying substrate. While the selective masking steps may take a variety of forms, conveniently they may take the form illustrated in FIGS. 1–4 wherein the wafer 11 is first cleaned in accordance with known standard techniques. Then the main surface is passivated to produce a thin passivation layer 13 such as an oxide or nitride. Next, a thin layer of resist 15 (e.g., photo, electron, x-ray or ion) is exposed and developed to provide a mask shown in FIG. 2 having at least one window 17 illustratively shown as a square window. These windows are located at points on the surface of the wafer 11 where it is desired to form field emitter cathode sites. Next, the portions of the passivation layer 13 not protected by the resist mask are etched by any well-known technique to result in the mask structure shown in FIG. 3. At this point, the developed resist 15 can be removed by any known means as indicated in FIG. 4.

Figure 5:
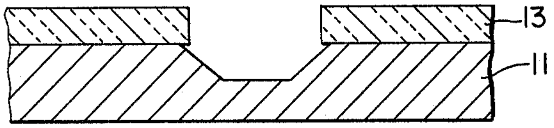
Figure 6:
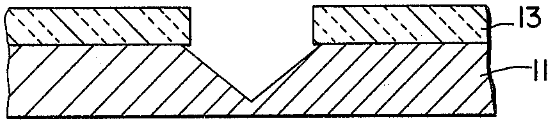
Figure 7:
Figure 8:
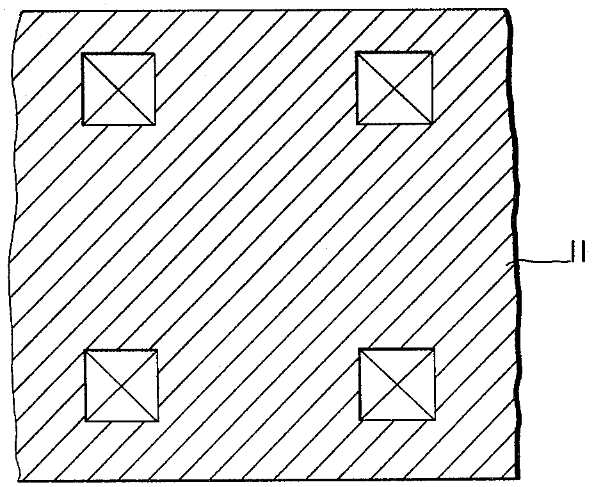
FIG. 8 depicts in top plan view the resulting intermediary structure resulting from the various processing steps previously described with relation to FIGS. 1–7.

In the next step, depicted in FIGS. 5 and 6, the single crystal material under the windows in the mask structure is orientation-dependent etched. The term "orientation dependent etching" as used in the specification is defined as etching in one crystal direction but not in another crystal direction. For example, an etch such as KOH/IPA or pyrocatechol-diamine may be used to preferentially attack the (100) planes of n-type or low and moderately doped p-type silicon. The etch will proceed to attack at a rapid rate until (111) planes are encountered and then the etch stops or is significantly slowed down. This action tends to produce a pyramidal hole whose (111) sides intersect at a crystallographically sharp point. It will be noted that all of the resultant points will be sharp even though the time in which one point is finished is not necessarily the same time in which a neighboring point or points in the array is finished. Further etching only makes a given hole deeper depending on whether the etch stops or is slowed down; the sharpness of the (111) plane intersections is not changed. The average depth of the holes can be determined by the size of the masking dots used initially, the relative etch rates of the (100) versus (111) planes, and the length of time of the etching process. Following this step, the oxide layer 13 is removed with a suitable etch, leaving the structure depicted in FIG. 7. FIG. 8 illustrates the structure of FIG. 7 in top plan view. The holes may be, for example, 2 μm in diameter, and spaced by 10 μm with a typical depth of 1.5 μm. This structure provides a mold for manufacturing the field emission cathodes.

Figure 9:
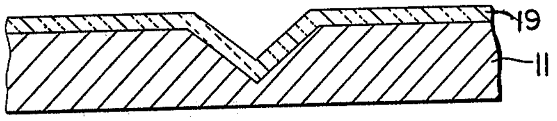
FIGS. 9–12 depict several of the basic final steps in manufacturing a field emitter array structure in accordance with the invention.
Figure 10:
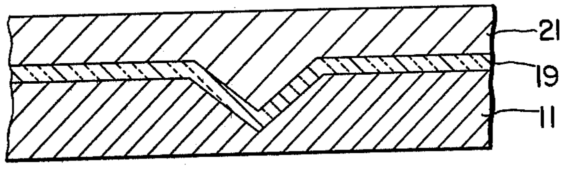
Figure 11:
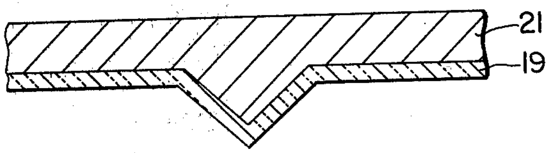
Figure 12:
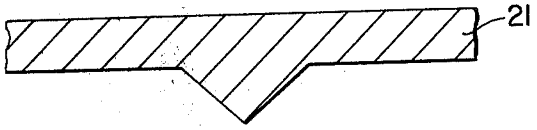

At this stage in the processing, there are several possible ways of proceeding further. One procedure is illustrated in FIGS. 9–12. The first step depicted in FIG. 9 is to cover the entire wafer 11 on the side having the holes with a thin passivation layer 19, such as a thermal $SiO_2$ layer, $Si_3N_4$ layer or a metal layer, typically 30 Angstroms thick. The next step depicted in FIG. 10 is to cover the intermediate structure shown in FIG. 9 with a thick layer of a material 21, such as a metal or a semiconductor, capable of emitting electrons under the influence of an electric field, which fills the holes and extends above the wafer 11. The electron-emitting material 21 may be applied by any known process such as CVD, sputtering, evaporation or liquid-deposition-plating, for example. Thereafter, the wafer 11 of single crystal material is etched away as depicted in FIG. 11. The purpose of the passivation layer 19 is to protect the crystallographically sharp point of the electron-emitting material 21 from the etch. The final processing step is to etch away the passivation layer 19 using a suitable etch such as, for example, hydrofluoric acid for $SiO_2$, leaving the structure shown in FIG. 12, wherein it will be seen that a sharp field emitter tip is provided at each site.

Figure 13:
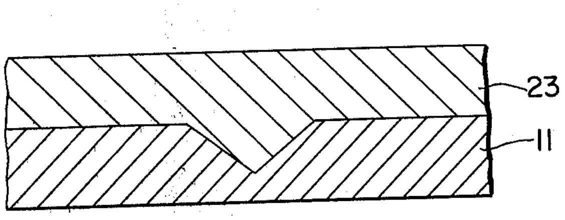
FIGS. 13 and 14 depict an alternative set of basic final steps in manufacturing a field emitter array structure in accordance with the invention.
Figure 14:
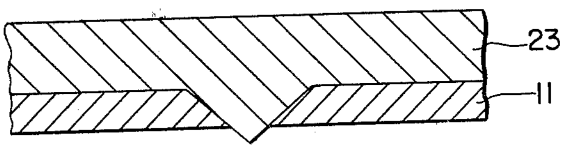

An alternative manner of proceeding from the processing stage depicted in FIG. 8 is illustrated in FIGS. 13–14 wherein the entire wafer 11 on the side having the holes is covered with a thick layer of material 23 such as a metal or semi-conductor, capable of emitting electrons under the influence of an electric field, which fills the holes and extends above the surface of the wafer 11. It is assumed that the electron-emitting material is impervious to the etch used in the next step. The resulting structure is shown in FIG. 13. Next, the wafer 11 is etched to a suitable depth to leave an exposed field emission cathode tip at each field emitter site, as depicted in FIG. 14. The final processing step is to passivate the remaining part of the wafer 11.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of The United States is:

1. A method of manufacturing a field-emitter structure comprising the steps of:

(a) providing a substrate of a single crystal material;

(b) selectively masking a main surface of the substrate such that the unmasked areas define at least one island on the main surface of the underlying substrate;

(c) orientation-dependent etching the single crystal material under the unmasked areas to form at least one hole whose sides intersect at a crystallographically sharp point;

(d) removing the mask;

(e) filling the holes with a layer of a material capable of emitting electrons under the influence of an electric field;

(f) extending the layer of electron-emitting material above the main surface of the substrate; and (g) etching the material of the substrate underneath the layer of electron-emitting material to expose at least one field-emitter cathode tip.

2. The method recited in claim 1 wherein step (g) includes:

removing the entire substrate of material from underneath the layer of electron-emitting material.

3. The method recited in claim 1 wherein step (b) includes:

forming a passivation layer on the main surface of the substrate; and removing portions of the passivation layer to open at least one window in the passivation layer.

4. The method recited in claim 3, wherein the passivation layer removing step includes:

coating resist on the passivation layer;

exposing the resist;

developing the exposed resist to provide a resist mask having at least one window; and etching the portions of the passivation layer not protected by the resist mask to open at least one window in the passivation layer.

5. The method recited in claim 1 including the step of:

covering the substrate with a passivation layer subsequent to step (d) and prior to step (e).

6. The method recited in claim 5 wherein step (g) includes:

removing the entire material of the substrate and the passivation layer from underneath the layer of electron-emitting material.

* * * * *